F. H. ALLEN.
SPRING WHEEL.
APPLICATION FILED NOV. 22, 1912.

1,058,517.

Patented Apr. 8, 1913.

Witnesses
M. F. Gammett.
P. M. Smith.

Inventor
Frank H. Allen
By Victor J. Evans
Attorney

UNITED STATES PATENT OFFICE.

FRANK HARLAN ALLEN, OF McNABB, ILLINOIS.

SPRING-WHEEL.

1,058,517.

Specification of Letters Patent.

Patented Apr. 8, 1913.

Application filed November 22, 1912. Serial No. 732,896.

*To all whom it may concern:*

Be it known that I, FRANK H. ALLEN, a citizen of the United States, residing at McNabb, in the county of Putnam and State of Illinois, have invented new and useful Improvements in Spring-Wheels, of which the following is a specification.

This invention relates to spring wheels, the object in view being to provide a construction of spring wheel which will enable the ordinary pneumatic tire to be dispensed with, while retaining the necessary resilient properties in the wheel to absorb all jar and vibration and prevent the transmission of the same to the axle and body of the vehicle.

With the above and other objects in view, the invention consists in the construction, combination and arrangement of parts, as will be hereinafter more fully described, illustrated in the accompanying drawings, and pointed out in the claim hereunto appended.

Figure 1:
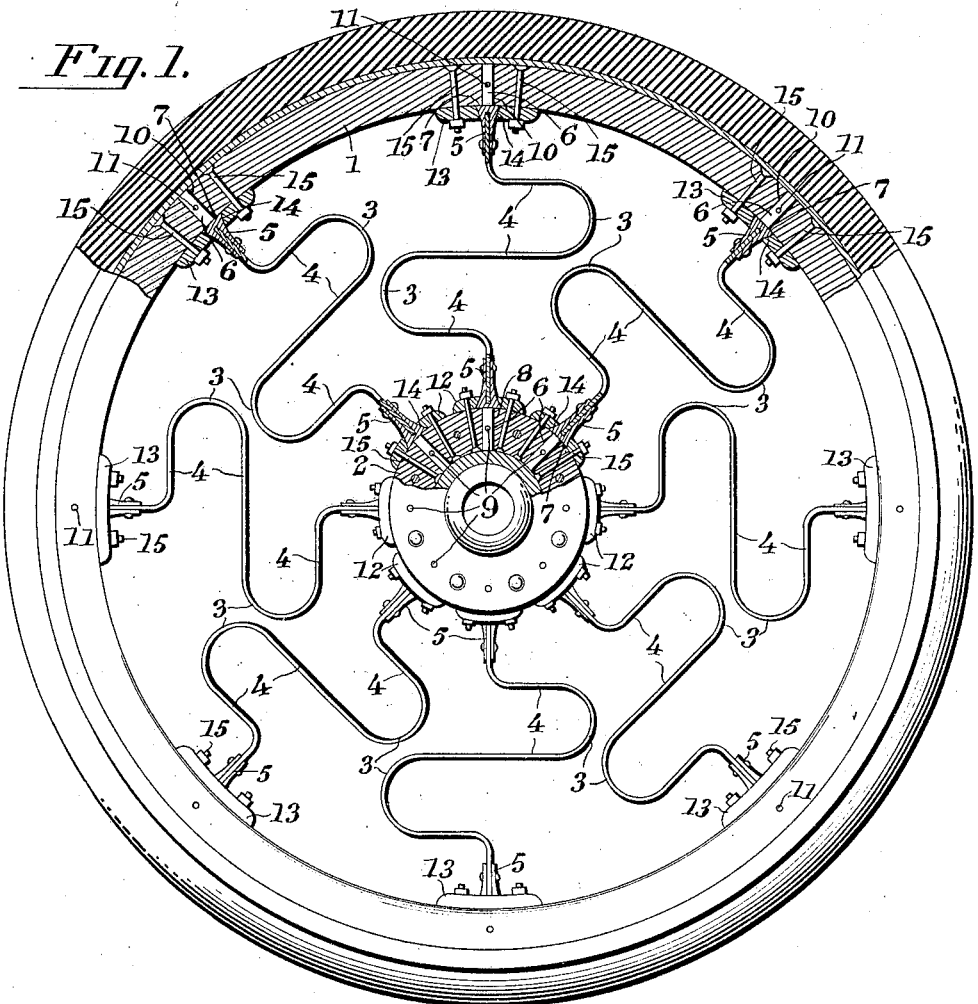
Figure 2:
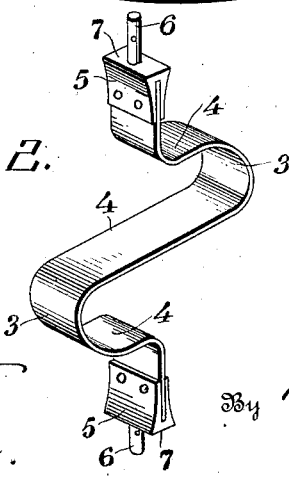
Figure 3:
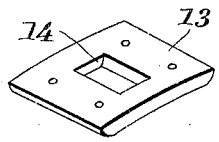

In the drawings: Figure 1 is a side elevation of a wheel, partly in section, illustrating the present invention. Fig. 2 is a detail perspective view of one of the springs. Fig. 3 is a detail perspective view of one of the keeper plates.

The wheel illustrated in the accompanying drawings, embodies a rim or felly 1 adapted to receive a non-puncturable tire of any construction, whether of metal, rubber, or the like, and a hub 2 of any suitable description. In lieu of the ordinary wooden spokes which connect the hub and felly, I employ a series of spring spokes, each of which is formed of a flat strip of spring metal which is bent and recurved in opposite directions to form the oppositely projecting convolutions or bends 3 connected by the integral comparatively straight portions 4, as illustrated in Figs. 1 and 2, the portions 4 extending substantially at right angles to the general direction of the springs from the hub to the felly.

The end portions of the springs are enlarged and tapered, as shown at 5, and at each end the spring is provided with a tenon 6 which is smaller in diameter than the larger end portion of the part 5, so as to leave a shoulder 7 which bears against the outer face of the hub 2, or the inner face of the felly 1, as the case may be.

The tenon 6 at the inner end of the spring spoke is received in a mortise 8 in the hub, and may be secured fixedly therein by a pin 9 inserted transversely through the hub and said tenon. The tenon 6 at the outer end of the spring spoke is likewise inserted in a mortise 10 in the felly and secured by means of a transverse pin or key 11.

In order to firmly attach the opposite ends of the spring spoke to the hub and felly, keeper plates 12 and 13 are provided, each of said plates being formed with a central countersunk or tapered hole 14 which fits over the enlarged tapered end portion of the spring spoke, as clearly shown in Fig. 1; thereby confining said end portion of the spoke closely against the hub or felly, as the case may be, the said keeper plates being firmly held in place by bolts 15, or the equivalent thereof, said bolts being inserted through openings in the felly and hub. The tapering fit between the keeper plates 12 and enlarged or tapered end portions of the spokes serves to crowd the shoulders 7 of the spokes into firm engagement with the felly and hub, and avoids any possibility of the same becoming loose and rattling.

Any number of spring spokes may be used in accordance with the size of the wheel, and the load to be imposed thereon, and this may be accomplished by varying the relative size of the hub 2 and felly 1. Likewise the material of which the spring spokes are composed may be varied in gage and temper to suit such load. In some cases, the keeper plates 12 and 13 may be permanently attached to the spokes.

What is claimed is:

A spring wheel, embodying a felly, a hub, a series of spokes each composed of a strip of spring metal reversely curved at a number of points forming convolutions which project alternately in opposite directions, the ends of the spring being gradually enlarged and tapered to form abutment shoulders to bear against the felly and hub, tenons projecting from said shoulders and entering mortises in the felly and hub, and keeper plates fastened to the felly and hub and provided with taper holes which receive the tapered enlargements at the ends of the springs.

In testimony whereof I affix my signature in presence of two witnesses.

FRANK HARLAN ALLEN.

Witnesses:
 VIRGIL V. VAL,
 JESSIE ANDERSON.